US012791125B2

(12) United States Patent
Arizmendi

(10) Patent No.: US 12,791,125 B2
(45) Date of Patent: Nov. 10, 2026

(54) TUBULAR GRIPPING DEVICE

(71) Applicant: Centergenics, LLC, Magnolia, TX (US)

(72) Inventor: Napoleon Arizmendi, Magnolia, TX (US)

(73) Assignee: Centergenics, LLC, Magnolia, TX (US)

( * ) Notice: Subject to any disclaimer, the term of this patent is extended or adjusted under 35 U.S.C. 154(b) by 0 days.

(21) Appl. No.: 19/079,323

(22) Filed: Mar. 13, 2025

(65) Prior Publication Data

US 2025/0290579 A1 Sep. 18, 2025

Related U.S. Application Data

(60) Provisional application No. 63/564,902, filed on Mar. 13, 2024.

(51) Int. Cl.
*F16L 7/00* (2006.01)
*E21B 17/04* (2006.01)

(52) U.S. Cl.
CPC ................. *F16L 7/00* (2013.01); *E21B 17/04* (2013.01)

(58) Field of Classification Search
CPC .................................. F16L 7/00; E21B 17/04
See application file for complete search history.

(56) References Cited

U.S. PATENT DOCUMENTS

| | | | |
|---|---|---|---|
| 2,533,973 | A | 12/1950 | Starkey |
| 2,652,270 | A | 9/1953 | Jones |
| 2,671,641 | A | 3/1954 | Hinkle |
| 2,855,052 | A | 10/1958 | Wright et al. |
| 2,901,269 | A | 8/1959 | Rickard |
| 2,907,189 | A | 10/1959 | Flieg |
| 2,936,625 | A | 5/1960 | Heiseler |
| 2,962,313 | A | 11/1960 | Conrad |
| 3,065,005 | A | 11/1962 | Hall, Sr. et al. |
| 3,600,010 | A | 8/1971 | Downs et al. |
| 3,646,777 | A | 3/1972 | Anderson et al. |
| 4,131,167 | A | 12/1978 | Richey |

(Continued)

FOREIGN PATENT DOCUMENTS

| | | | |
|---|---|---|---|
| CN | 113389503 | A | 9/2021 |
| GB | 872345 | A | 7/1961 |

(Continued)

OTHER PUBLICATIONS

PCT International Search Report dated Jun. 24, 2025, International Application No. PCT/US25/19862, pp. 1-3.

*Primary Examiner* — P. Macade Nichols
(74) *Attorney, Agent, or Firm* — Grollitsch Law, PLLC

(57) ABSTRACT

A tubular gripping device is disclosed. The tubular gripping device includes a body having an inner surface. The tubular gripping device also includes at least one grip ring having a first surface and a second surface. The at least one grip ring is movable from a retracted position to an extended position, The tubular gripping device further includes a connection member configured to hold the at least one grip ring in the retracted position, wherein the first surface of the at least one grip ring engages the inner surface of the body when the at least one grip ring is in the retracted position and the second surface of the at least one grip ring engages the casing when the at least grip ring is in the extended position.

19 Claims, 8 Drawing Sheets

(56) References Cited

U.S. PATENT DOCUMENTS

| | | | | |
|---|---|---|---|---|
| 4,245,709 | A | 1/1981 | Manuel | |
| 4,438,822 | A | 3/1984 | Russell | |
| 5,335,723 | A | 8/1994 | Mouton | |
| 5,575,333 | A | 11/1996 | Lirette et al. | |
| 5,609,226 | A | 3/1997 | Penisson | |
| 5,706,894 | A | 1/1998 | Hawkins, III | |
| 5,794,988 | A | 8/1998 | Gill | |
| 5,860,760 | A | 1/1999 | Kirk | |
| 6,186,560 | B1 | 2/2001 | Gill | |
| 6,435,275 | B1 | 8/2002 | Kirk et al. | |
| 6,533,034 | B1 | 3/2003 | Barger | |
| 6,986,533 | B2 | 1/2006 | Ko | |
| 7,647,947 | B1 * | 1/2010 | Littlebrant ................ | F16L 7/00 138/159 |
| 8,696,041 | B1 | 4/2014 | Kemp | |
| 10,801,272 | B2 | 10/2020 | Arizmendi et al. | |
| 2002/0112853 | A1 | 8/2002 | Buytaert | |
| 2010/0218956 | A1 | 9/2010 | Buytaert et al. | |
| 2011/0114338 | A1 | 5/2011 | Casassa et al. | |
| 2014/0000900 | A1 | 1/2014 | Leiper et al. | |
| 2015/0137514 | A1 | 5/2015 | Gifford | |
| 2015/0252825 | A1 * | 9/2015 | Lowth ....................... | F16B 2/06 24/493 |
| 2018/0119497 | A1 | 5/2018 | Arizmendi et al. | |
| 2021/0285292 | A1 | 9/2021 | Arsoski | |

FOREIGN PATENT DOCUMENTS

| | | | |
|---|---|---|---|
| GB | 1476443 | A | 6/1977 |
| GB | 2571038 | A | 8/2019 |
| GB | 2594897 | B | 4/2022 |
| RU | 164536 | U1 | 9/2016 |
| SU | 794170 | A1 | 1/1981 |
| WO | 1997048268 | A2 | 6/1997 |
| WO | 2012095671 | A2 | 7/2012 |

* cited by examiner

TUBULAR GRIPPING DEVICE

CROSS-REFERENCE TO RELATED APPLICATIONS

This application claims priority to U.S. Provisional Patent Application No. 63/564,902, filed on Mar. 13, 2024, which is incorporated by reference.

BACKGROUND

Within the area of subterranean well construction, centralizers are used to keep the tubular casing centered in the wellbore to facilitate placement of the casing in the bore and to prevent cementing the pipe against a side of the borehole. Centralizers isolate the outer surface of the wellbore pipe from the inner surface of the wellbore. Additionally, in long horizontal sections of wellbore, centralizers provide support for the tubular casing section, preventing the wellbore pipe from laying on the lower inner surface of the horizontal wellbore. In some instances, a stop collar may be affixed around a tubular casing. For example, in situations where a non-gripping centralizer is employed, the non-gripping centralizer may be used in conjunction with the stop collar which grips the tubular casing and may interface with the non-gripping centralizer to constrain linear and axial movement of the centralizer with respect to the tubular casing. There are times when the stop collar used to constrain the centralizer may lose its grip on the tubular casing. Therefore, there is a need for a stop collar that is configured to securely grip the tubular casing.

SUMMARY

A tubular gripping device is disclosed. The tubular gripping device includes a body having an inner surface. The tubular gripping device also includes at least one grip ring having a first surface and a second surface. The at least one grip ring is movable from a retracted position to an extended position, The tubular gripping device further includes a connection member configured to hold the at least one grip ring in the retracted position, wherein the first surface of the at least one grip ring engages the inner surface of the body when the at least one grip ring is in the retracted position and the second surface of the at least one grip ring engages the casing when the at least grip ring is in the extended position.

A method of using a tubular gripping device on a casing is disclosed. The method includes placing the tubular gripping device on the casing. The tubular gripping device includes a body and a self-locking mechanism. The method also includes moving the self-locking mechanism from a retracted position to an expanded position. The method further includes locking the tubular gripping mechanism on the casing by moving the body relative to the self-locking mechanism when the self-locking mechanism is in the expanded position.

A tubular gripping device is disclosed. The tubular gripping device includes a body. The tubular gripping device further includes a self-locking mechanism disposed in the body. The self-locking mechanism is configured to move from an expanded position to a retracted position upon release of a connection member. The body is movable in an axial direction relative to the self-locking mechanism when the self-locking mechanism is in the retracted position, wherein a load shoulder is formed in the body as the body moves relative to the self-locking mechanism.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 1:
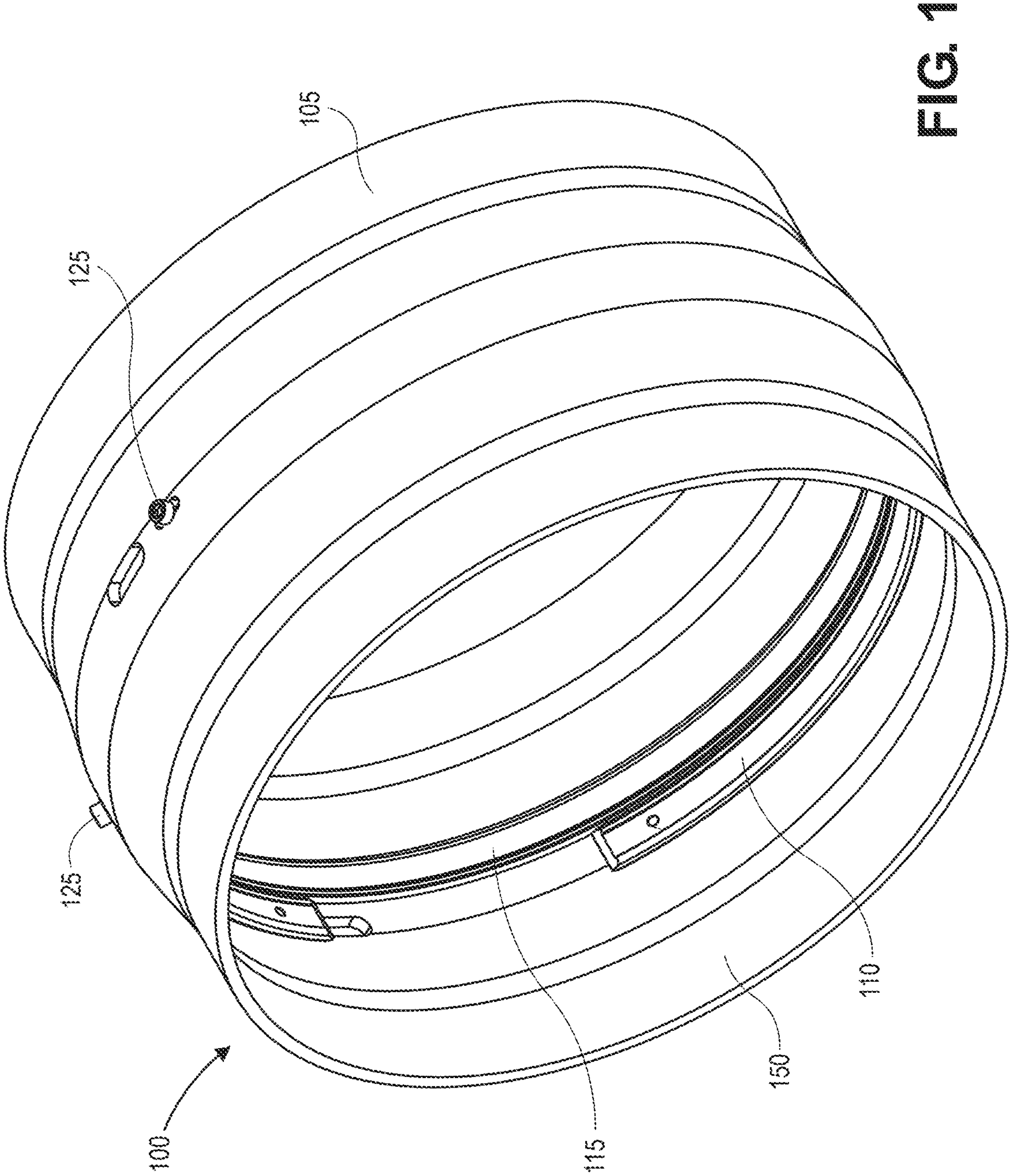
FIG. 1 illustrates an isometric view of a tubular gripping device, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

The present invention can be embodied as casing stop collar containing a self-locking mechanism can be in the form of a C-ring or other component arrangements that can be produced with a self-bias for engagement into radial contact with the outer surface of the casing. The self-locking mechanism is either contained within or placed adjacent to tubular outer body which contains an inner surface an outer tubular body which incorporates a tapered inner surface that engages with the outer surface of the self-locking mechanism. The inner surface of the self-locking mechanism can be equipped with wickers or other high friction surfaces at the point of casing engagement to prevent initial slipping. The self-locking mechanism can be installed into position on the casing by holding the mechanism in an expanded position through a retaining means and then releasing the retaining means to allow the self-locking mechanism to revert to its contracted state and in initial radial contact with the casing. The invention is not limited by the configuration of the retaining means. The self-locking mechanism incorporates a $1^{st}$ smooth sliding load surface that initially engages the inner taper of the outer tubular body and a sharp or discontinuous $2^{nd}$ surface feature that can be in the form of a wicker that only engages the inner taper of the outer tubular member after a prescribed amount of deformation of the outer tubular member takes place. Engagement of the discontinuous $2^{nd}$ surface against the outer tubular body and the subsequent application of additional axial load causes local deformation at the point of contact of the outer tubular body but prevents further bulk flaring of the tubular body against the $1^{st}$ sliding load surface and similarly prevents further bulk axial relative movement between the outer tubular body and the self-locking mechanism. The incorporation of the external wicker on the outer surface of the self-locking mechanism or C-ring provides similar utility as the secondary load shoulder contained within the outer tubular body referenced in U.S. Pat. No. 10,801,272. Incorporating a wicker on the outer surface of the self-locking mechanism has advantages over the aforementioned secondary load shoulder provided in the outer tubular member in that due to the fixed manufactured axial distance between the $1^{st}$ smooth sliding load surface and the wicker, amount of movement and resulting energization loads to cause engagement of the outer wicker are the same independent of the actual outer diameter of the base casing has a wide tolerance allowance. A further advantage over the implementation of a secondary load shoulder within the outer tubular body is that there is that the outer tubular body can be more readily manufactured without any abrupt surface features and can be easily formed from cylindrical tubular stock through shaping processes rather than machining/cutting processes. Further description of the invention is provided in the description of the included Figures.

FIG. 1 illustrates an isometric view of a tubular gripping device 100, according to an embodiment. As described herein, the tubular gripping device 100 includes a self-locking mechanism for engagement into radial contact with the outer surface of a casing. The tubular gripping device 100 includes a body 105 with an inner surface 150. The tubular gripping device further includes a first grip ring 110 and a second grip ring 115 disposed on the inner surface 150 in the body 105. The self-locking device that includes the first grip ring 110 and the second grip ring 115 is configured to attach the tubular gripping device 100 to the outer surface of the casing (not shown). The tubular gripping device 100 is bi-directional which allows the self-locking mechanism to engage the outer surface of the casing whether it is moved in a first axial direction or a second axial direction.

The tubular gripping device 100 shown in FIG. 1 is in the pre-installed position. The tubular gripping device 100 includes a plurality of connection members 125, such as screws. The connection members 125 are inserted through holes in the body 105 and into engagement with the first grip ring 110 and the second grip ring 115. The first grip ring 110 and the second grip ring 115 are inwardly biased. The connection members 125 are configured to hold the first grip ring 110 and the second grip ring 115 in an expanded position and against the inner surface 150 of the body 105 when the tubular gripping 100 is in the pre-installed position. In one embodiment, the first grip ring 110 and the second grip ring 115 are C-Shaped grip rings.

Figure 2A:
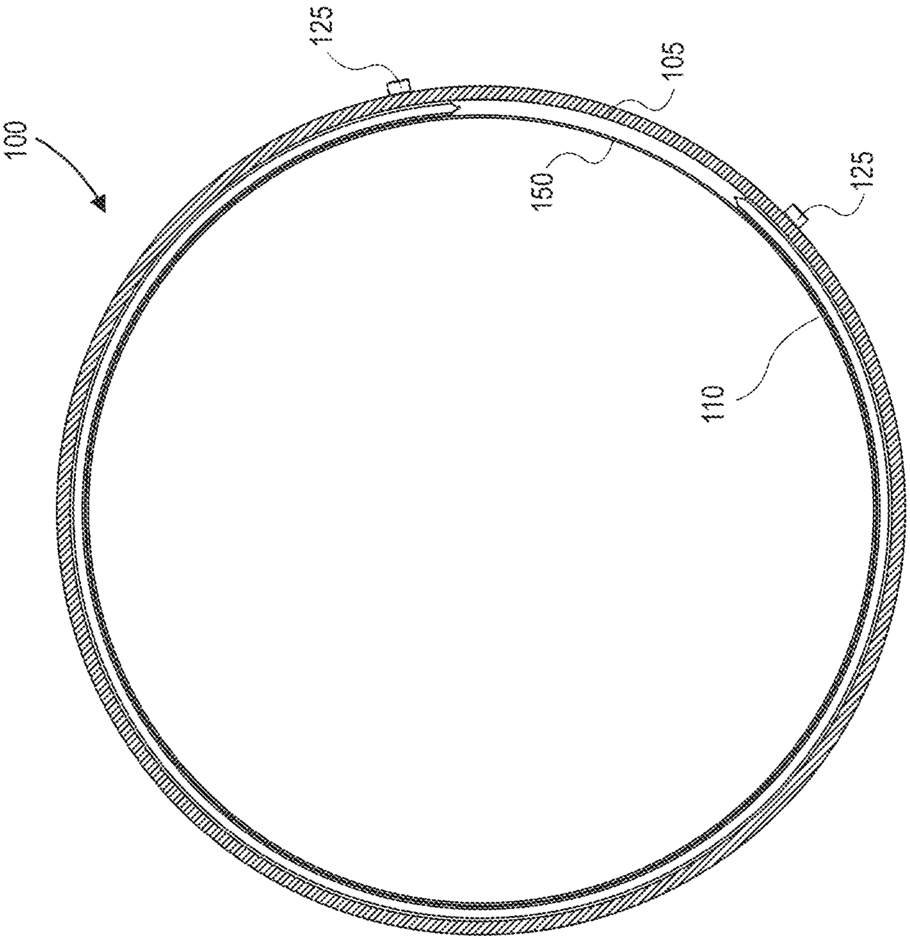
FIG. 2A illustrates a cross-sectional view of the tubular gripping device, according to an embodiment.
Figure 2:
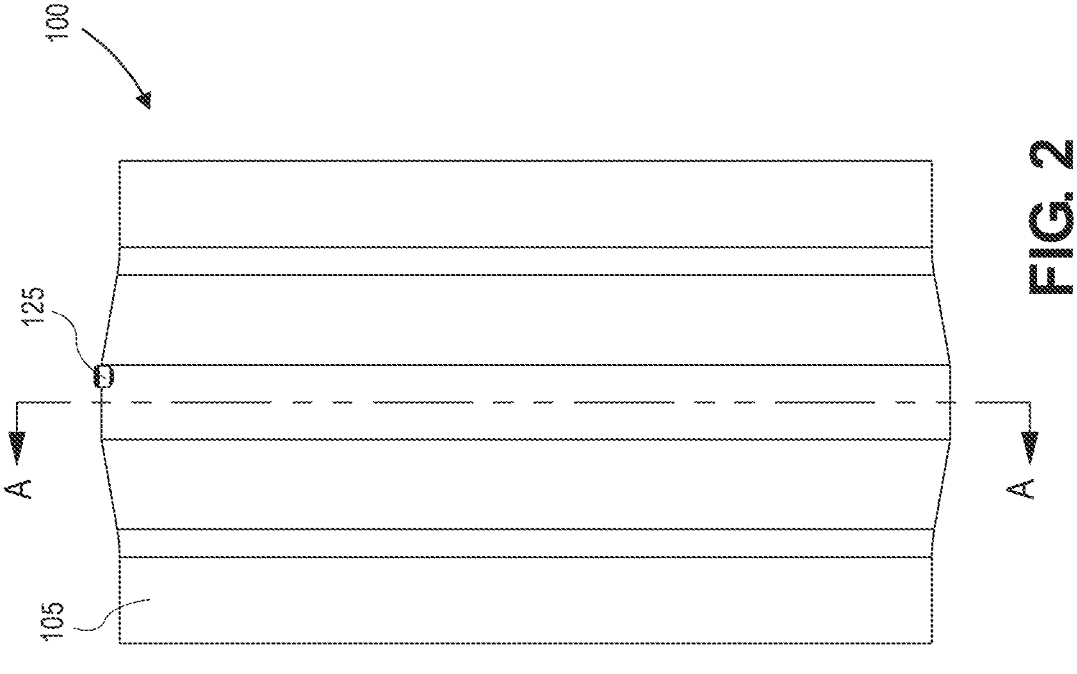
FIG. 2 illustrates a side view of the tubular gripping device, according to an embodiment.

FIG. 2 illustrates a side view of the tubular gripping device 100, according to an embodiment. FIG. 2A illustrates a cross-sectional view of the tubular gripping device 100, according to an embodiment. As shown, the first grip ring 110 is held against the inner surface 150 of the body 105 of the tubular gripping device 100 by connection members 125.

Figure 3:
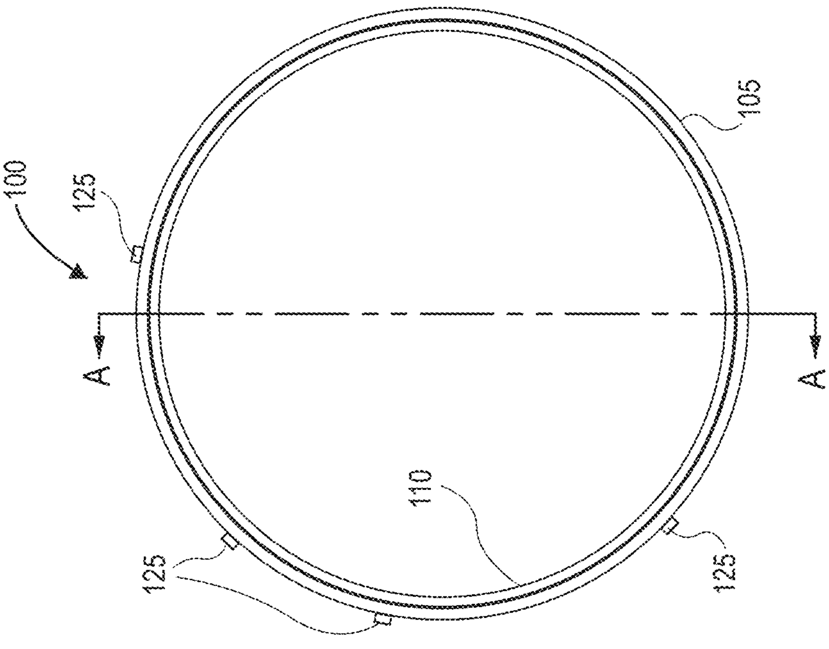
FIG. 3 illustrates an end view of the tubular gripping device, according to an embodiment.
Figure 3A:
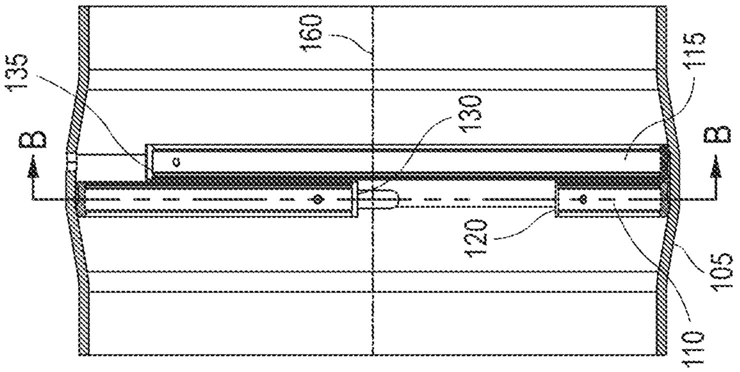
FIG. 3A illustrates a cross-sectional view of the tubular gripping device, according to an embodiment.
Figure 3B:
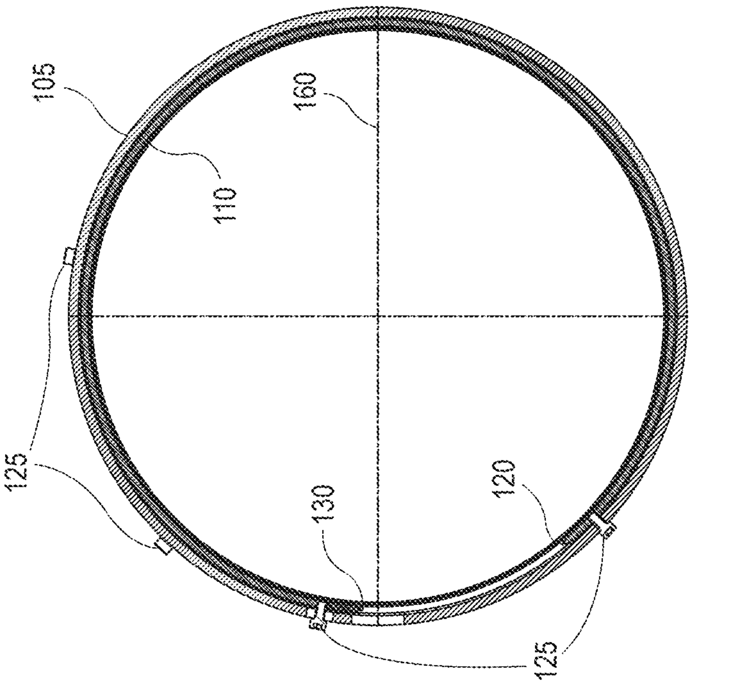
FIG. 3B illustrates a cross-sectional side view of the tubular gripping device, according to an embodiment.

FIG. 3 illustrates an end view of the tubular gripping device 100, according to an embodiment. FIGS. 3A and 3B illustrate a cross-sectional view of the tubular gripping device 100, according to an embodiment. As shown, the first grip ring 110 is disposed adjacent the second grip ring 115 in the axial direction of a centerline 160 of the tubular gripping device 100. As also shown, a first end 120 of the first grip ring 110 is offset from a first end 135 of the second grip ring 115. Similarly, a second end 130 of the first grip ring 110 is offset from a second end (not shown) of the second grip ring 115. The ends of each grip ring 110, 115 are held in place by the connection members 125.

Figures 4, 5, 6, 7:
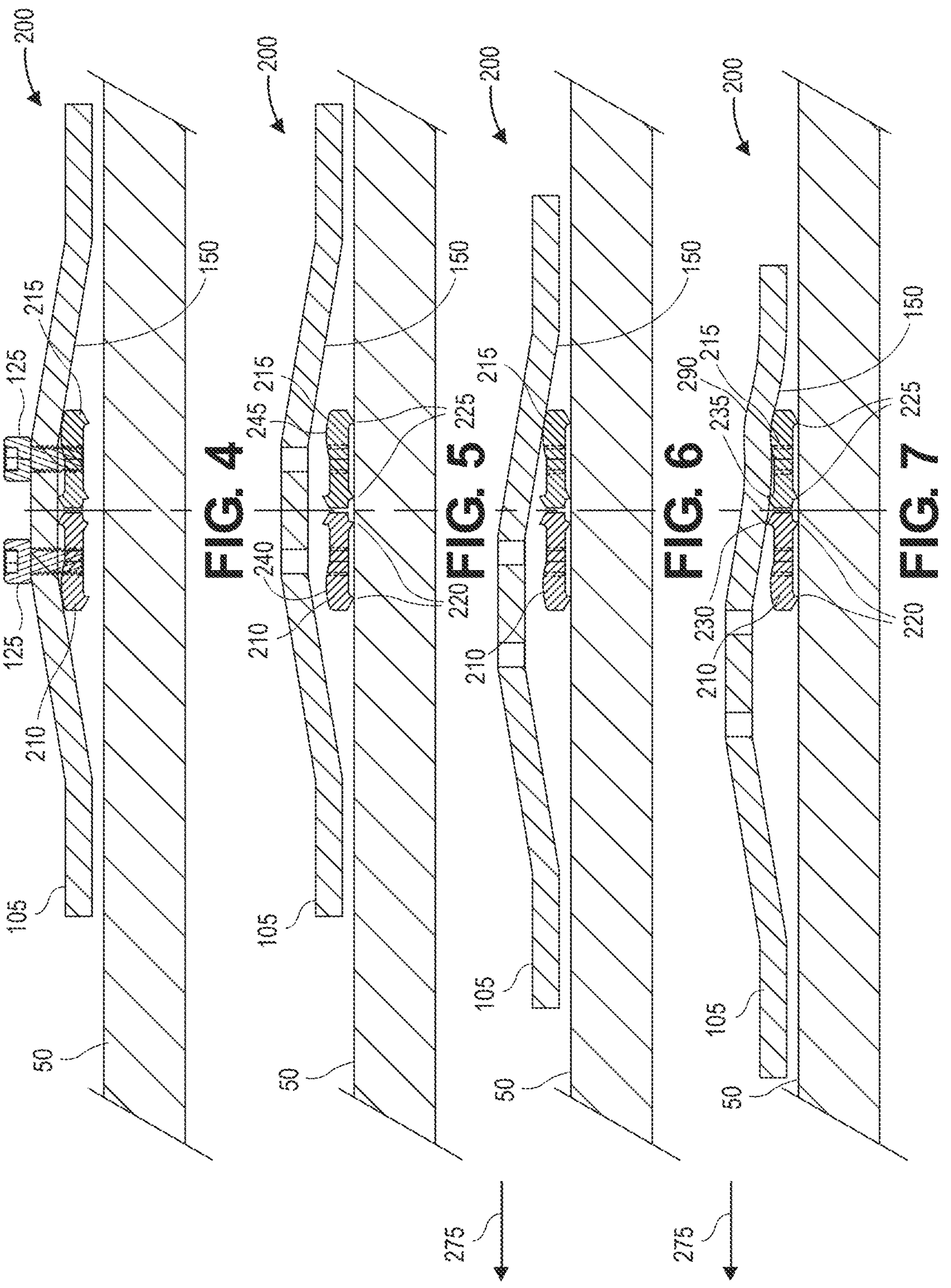
FIG. 4 is a sectional view of a tubular gripping device in a first (e.g. pre-installed) position, according to an embodiment.
FIG. 5 is a sectional view of the tubular gripping device in a second position, according to an embodiment.
FIG. 6 is a sectional view of the tubular gripping device in a third position, according to an embodiment.
FIG. 7 is a sectional view of the tubular gripping device in a fourth (e.g. engaged) position, according to an embodiment.

FIG. 4 is a sectional view of a tubular gripping device 200 in a first (e.g. pre-installed) position, according to an embodiment. The tubular gripping device 200 is similar to tubular gripping device 100 as shown in FIGS. 1-3. For convenience, the components in FIGS. 4-7 that are similar to the components in FIGS. 1-3 will be labelled with the same reference number.

As shown in FIG. 4, the connection members 125 are configured to hold a first grip ring 210 and a second grip ring 215 against the inner surface 150 of the body 105 when the tubular gripping device 200 is in the pre-installed position. In other words, the first grip ring 210 and the second grip ring 215 (i.e., self-locking mechanism) are in an expanded position away from engagement with an outer surface of a casing 50. As also shown, the first grip ring 210 and the second grip ring 215 have a substantially. constant wall thickness where the connection members 125 are installed.

FIG. 5 is a sectional view of the tubular gripping device 200 in a second position, according to an embodiment. As shown, the connection members 125 have been removed, which allows the first grip ring 210 and the second grip ring 215 to move into engagement with the outer surface of the casing 50. In other words, the first grip ring 210 and the second grip ring 215 have moved from an expanded position (FIG. 4) to a retracted position (FIG. 5).

The first grip ring 215 includes a grip profile 220, such as wickers, on an inner surface. The grip profile 220 is configured to grip (or bite or penetrate) into the outer surface of the casing 50. Similarly, the second grip ring 215 includes a grip profile 225, such as wickers, on an inner surface that is configured to grip (or bite or penetrate) into the outer surface of the casing 50. The second grip ring 215 further includes a sliding load surface 245 that is configured to engage with the inner surface 150 if the body 105 of the tubular gripping device 200. The first grip ring 210 may also include a sliding load surface 240. The tubular gripping device 200 is bi-directional, which allows the tubular gripping device 200 to be activated whether the body 105 is moved in a first axial direction as described herein or a second axial direction because both the first and second grip rings 210, 215 include the sliding load surface 240, 245. In the position shown in FIG. 5, the tubular gripping device 200 is in a neutral position where no external forces are applied to the body 105.

FIG. 6 is a sectional view of the tubular gripping device 200 in a third position, according to an embodiment. External axial applied forces have moved the body 105 in a first axial direction 275, which causes the body 105 to come into contact with the second grip ring 215. As shown, the sliding load surface 245 of the second grip ring 215 has engaged with a taper on the inner surface 150 of the body 105. As also shown, the grip profile 225 of the second grip ring 215 has not yet fully engaged with the outer surface of casing 50.

FIG. 7 is a sectional view of the tubular gripping device 200 in a fourth (e.g. engaged) position, according to an embodiment. External axial applied forces have moved the body 105 further in the first axial direction 275. The movement of the body 105 has caused radial deformation of the body 105 responding to the reactive loads at the point of slidable contact between the sliding load surface 245 of the second grip ring 215 and the taper on the inner surface 150 of the body 105.

As shown in FIG. 7, the sliding load surface 245 of the second grip ring 215 is fully engaged with the inner surface 150 of the body 105. Also, a grip profile 235, such as wickers, on an outer surface of the second grip ring 215 has engaged (e.g., grip or bite) with the inner surface 150 of the body 105. In the same manner, a grip profile 230, such as wickers, on an outer surface of the first grip ring 210 may engage (e.g., grip or bite or penetrate) with the inner surface 150 of the body 105 depending on location of the first grip ring 210. In other words, in this configuration, the first grip ring 210 may come in contact with the surface 150 but is free to slide in the direction 275. If it moves in the direction 275, it will only grip when loaded from the opposite direction (from direction 275). As also shown, the grip profiles 220, 225 of the first and second grip rings 210, 215 has engaged (e.g., grip or bite) with the outer surface of the casing 50. The associated axial movement is shown to have occurred to the extent that grip profile 235 of the second grip ring 215 has engaged the body 105 to form a load shoulder 290 in the body 105. In other words, the body 105 is reformed to create the load shoulder 290 due to the engagement (or penetration) of the grip profile 235 of the second grip ring 215 with the body 105. Additional applied load to the body 105 will not cause substantial additional movement of the body 105 as the engaged grip profile 235 will tend to resist further relative sliding between the second grip ring 215 and the body 105.

Figures 8, 9, 10, 11, 12:
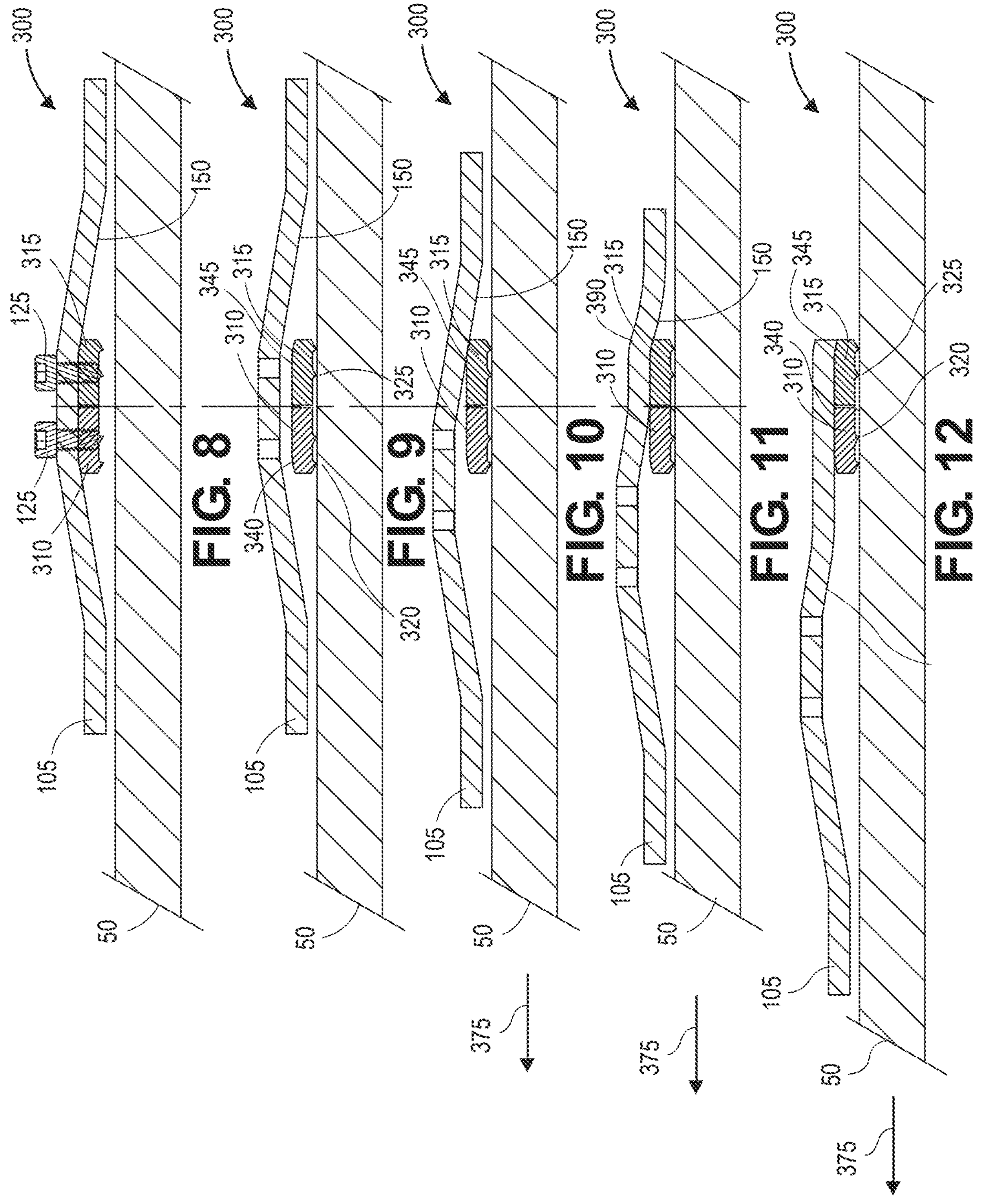
FIG. 8 is a sectional view of a tubular gripping device in a first (e.g. pre-installed) position, according to an embodiment.
FIG. 9 is a sectional view of the tubular gripping device in a second position, according to an embodiment.
FIG. 10 is a sectional view of the tubular gripping device in a third position, according to an embodiment.
FIG. 11 is a sectional view of the tubular gripping device in a fourth position, according to an embodiment.
FIG. 12 is a sectional view of the tubular gripping device in a fifth (e.g. engaged) position, according to an embodiment.

FIG. 8 is a sectional view of a tubular gripping device 300 in a first (e.g. pre-installed) position, according to an embodiment. The tubular gripping device 300 is similar to tubular gripping device 100 as shown in FIGS. 1-3. For convenience, the components in FIGS. 8-12 that are similar to the components in FIGS. 1-3 will be labelled with the same reference number.

As shown in FIG. 8, the connection members 125 are configured to hold a first grip ring 310 and a second grip ring 315 against the inner surface 150 of the body 105 when the tubular gripping device 300 is in the pre-installed position. In other words, the first grip ring 310 and the second grip ring 315 (i.e., self-locking mechanism) are in an expanded position away from engagement with an outer surface of a casing 50. As also shown, the first grip ring 310 and the second grip ring 315 have a substantially constant wall thickness where the connection members 125 are installed.

FIG. 9 is a sectional view of the tubular gripping device 300 in a second position, according to an embodiment. As shown, the connection members 125 have been removed, which allows the first grip ring 310 and the second grip ring 315 to move into engagement with the outer surface of the casing 50. In other words, the first grip ring 310 and the second grip ring 315 have moved from an expanded position (FIG. 8) to a retracted position (FIG. 9).

The first grip ring 315 includes a grip profile 320, such as wickers, on an inner surface. The grip profile 320 is configured to grip (or bite) into the outer surface of the casing 50. Similarly, the second grip ring 315 includes a grip profile 325, such as wickers, on an inner surface that is configured to grip (or bite or penetrate) into the outer surface of the casing 50. The second grip ring 315 further includes a sliding load surface 345 that is configured to engage with the inner surface 150 if the body 105 of the tubular gripping device 300. The first grip ring 310 may also include a sliding load surface 340. The tubular gripping device 300 is bi-directional, which allows the tubular gripping device 300 to be activated whether the body 105 is moved in a first axial direction as described herein or a second axial direction because both the first and second grip rings 310, 315 include the sliding load surfaces 340, 345. In the position shown in FIG. 9, the tubular gripping device 300 is in a neutral position where no external forces are applied to the body 105.

FIG. 10 is a sectional view of the tubular gripping device 300 in a third position, according to an embodiment. External axial applied forces have moved the body 105 in a first axial direction 375, which causes the body 105 to come into contact with the second grip ring 315. As shown, the sliding load surface 345 of the second grip ring 315 has engaged with a taper on the inner surface 150 of the body 105. As also shown, the grip profile 325 of the second grip ring 315 has not yet fully engaged with the outer surface of casing 50.

FIG. 11 is a sectional view of the tubular gripping device in a fourth position, according to an embodiment. External axial applied forces have moved the body 105 further in the first axial direction 375, which causes the inner surface 150 of the body 105 to engage the sliding surface 340 of the first grip ring 310 and the sliding surface 345 of the second grip ring 315.

FIG. 12 is a sectional view of the tubular gripping device 300 in a fourth (e.g. engaged) position, according to an embodiment. External axial applied forces have moved the body 105 further in the first axial direction 375. The additional movement of the body 105 causes radial deformation of the body 105 responding to the reactive loads at the point of slidable contact between the sliding load surfaces 340, 345 of the first and second grip rings 310, 315 and the inner surface 150 of the body 105.

Additional axial movement is shown to have occurred compared to the condition of initial contact depicted in FIG. 11 and a portion of the body 105 has flared sufficiently that any further applied axial loads would cause the outer member to fully slide off and disengage from the self-locking mechanism (first and second grip rings 310, 315). The associated axial movement is shown to have occurred to the extent that the sliding load surface 345 of the second grip ring 315 has engaged the body 105 to form a load shoulder 390 in the body 105. In other words, the body 105 is reformed to create the load shoulder 390 due to the engagement (or penetration) of the sliding load surface 345 of the second grip ring 315 with the body 105.

As shown in FIG. 12, the sliding load surfaces 340, 345 of the first and second grip rings 310, 315 are fully engaged with the inner surface 150 of the body 105. As also shown, the grip profiles 320, 325 of the first and second grip rings 310, 315 has engaged (e.g., grip or bite or penetrate) with the outer surface of the casing 50. The associated axial movement is shown to have occurred to the extent that the first and second grip rings 310, 315 has engaged the taper of the body 105. Additional applied load to the body 105 will not cause substantial additional movement of the body 105 will tend to resist further relative sliding between the first and second grip rings 310, 315 and the body 105.

Figures 13, 14, 15, 16:
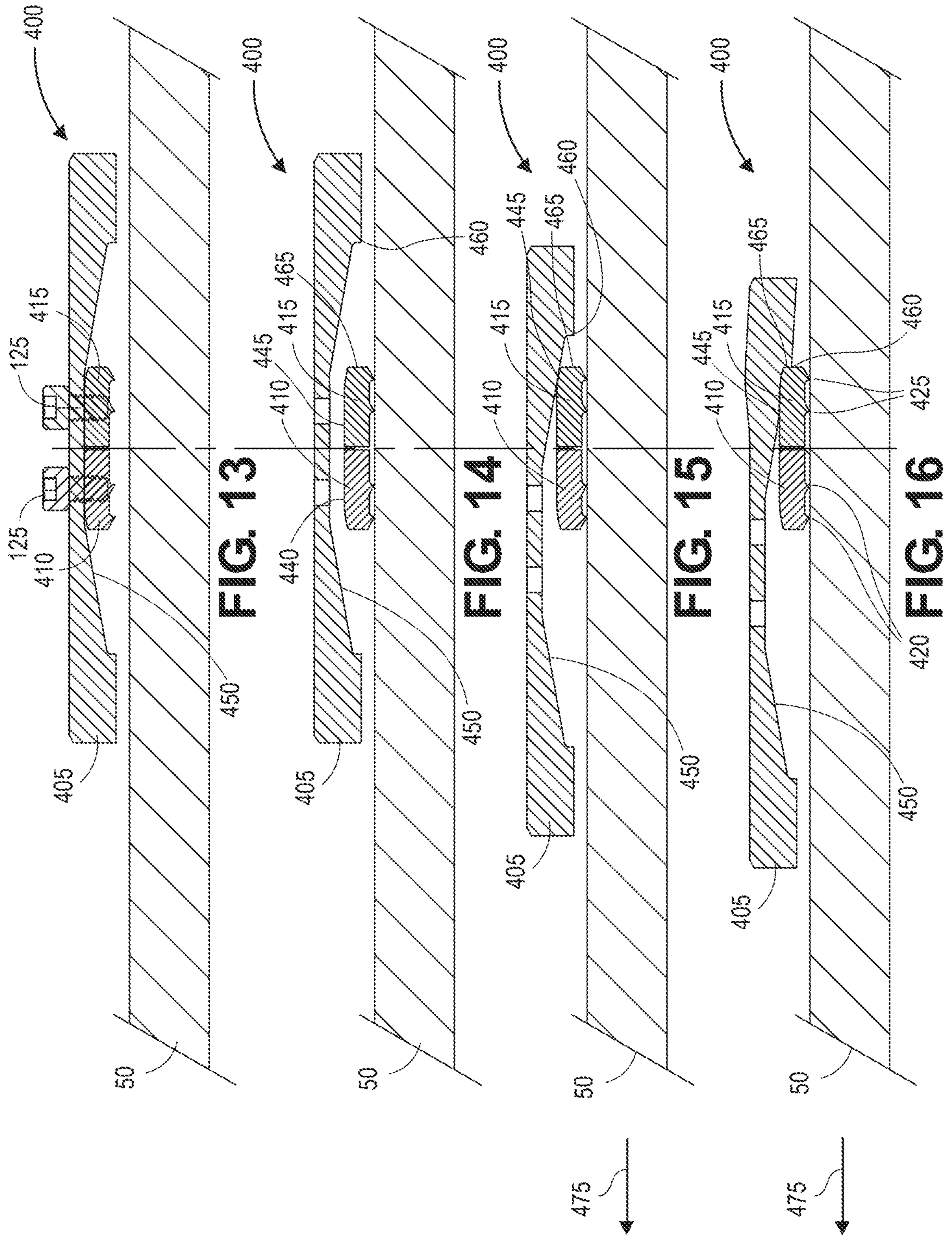
FIG. 13 is a sectional view of a tubular gripping device in a first (e.g. pre-installed) position, according to an embodiment.
FIG. 14 is a sectional view of the tubular gripping device in a second position, according to an embodiment.
FIG. 15 is a sectional view of the tubular gripping device in a third position, according to an embodiment.
FIG. 16 is a sectional view of the tubular gripping device in a fourth (e.g. engaged) position, according to an embodiment.

FIG. 13 is a sectional view of a tubular gripping device 400 in a first (e.g. pre-installed) position, according to an embodiment. The tubular gripping device 400 is similar to tubular gripping device 100 as shown in FIGS. 1-3. For convenience, the components in FIGS. 13-16 that are similar to the components in FIGS. 1-3 will be labelled with the same reference number.

As shown in FIG. 13, the connection members 125 are configured to hold a first grip ring 410 and a second grip ring 415 against an inner surface 450 of a body 405 when the tubular gripping device 400 is in the pre-installed position. In other words, the first grip ring 410 and the second grip ring 415 (i.e., self-locking mechanism) are in an expanded position which is away from engagement with an outer surface of a casing 50. As also shown, the first grip ring 410 and the second grip ring 415 have a substantially constant wall thickness where the connection members 125 are installed.

FIG. 14 is a sectional view of the tubular gripping device 400 in a second position, according to an embodiment. As shown, the connection members 125 have been removed, which allows the first grip ring 410 and the second grip ring 415 to move into engagement with the outer surface of the casing 50. In other words, the first grip ring 410 and the second grip ring 415 have moved from an expanded position (FIG. 13) to a retracted position (FIG. 14).

The first grip ring 415 includes a grip profile 420, such as wickers, on an inner surface. The grip profile 420 is configured to grip (or bite) into the outer surface of the casing 50. Similarly, the second grip ring 415 includes a grip profile 425, such as wickers, on an inner surface that is configured to grip (or bite or penetrate) into the outer surface of the casing 50. The second grip ring 415 further includes a sliding load surface 445 that is configured to engage with the inner surface 450 if the body 405 of the tubular gripping device 400. The first grip ring 410 may also include a sliding load surface 440 that may engage the surface 450. In other words, in this configuration, the first grip ring 410 may come in contact with the surface 450 but is free to slide in the direction 475. If it slides in direction 475, it will only grip when loaded from the opposite direction (from direction 475). The second grip ring 415 includes a load shoulder 465 that is configured to engage a load shoulder 460 on the body 405. In a similar manner the first grip ring 410 may include a load shoulder to engage a load shoulder on the body 450.

The tubular gripping device 400 is bi-directional, which allows the tubular gripping device 400 to be activated whether the body 405 is moved in a first axial direction as described herein or a second axial direction because both the first and second grip rings 410, 415 include the sliding load surface 440, 445. Further, the first and second grip rings 410, 415 may include a load shoulder that is configured to engage a load shoulder on the body 405. In the position shown in FIG. 14, the tubular gripping device 400 is in a neutral position where no external forces are applied to the body 405.

FIG. 15 is a sectional view of the tubular gripping device 400 in a third position, according to an embodiment. External axial applied forces have moved the body 405 in a first axial direction 475, which causes the body 405 to come into contact with the second grip ring 415. As shown, the sliding load surface 445 of the second grip ring 415 has engaged with a taper on the inner surface 450 of the body 405. As also shown, the grip profile 425 of the second grip ring 415 has not yet fully engaged with the outer surface of casing 50.

FIG. 16 is a sectional view of the tubular gripping device 400 in a fourth (e.g. engaged) position, according to an embodiment. External axial applied forces have moved the body 405 further in the first axial direction 475. The movement of the body 405 may cause radial deformation of the body 405 in response to the reactive loads at the point of slidable contact between the sliding load surface 445 of the second grip ring 415 and the taper on the inner surface 450 of the body 405.

As shown in FIG. 16, the sliding load surface 445 of the second grip ring 415 is fully engaged with the inner surface 450 of the body 405 and the load shoulder 465 of the second grip ring 415 is fully engaged with the load shoulder 460 of the body 405. As also shown, the grip profiles 420, 425 of the first and second grip rings 410, 415 has engaged (e.g., grip or bite) with the outer surface of the casing 50. The associated axial movement is shown to have occurred to the extent that the second grip ring 415 has engaged the taper of the body 405 and the load shoulder 465 of the second grip ring 415 has engaged with the load shoulder 460 of the body 405. Additional applied load to the body 405 will not cause substantial additional movement of the body 405 as the engaged load shoulders 460, 465 will tend to resist further relative sliding between the second grip ring 415 and the body 405.

Figures 17, 18, 19, 20:
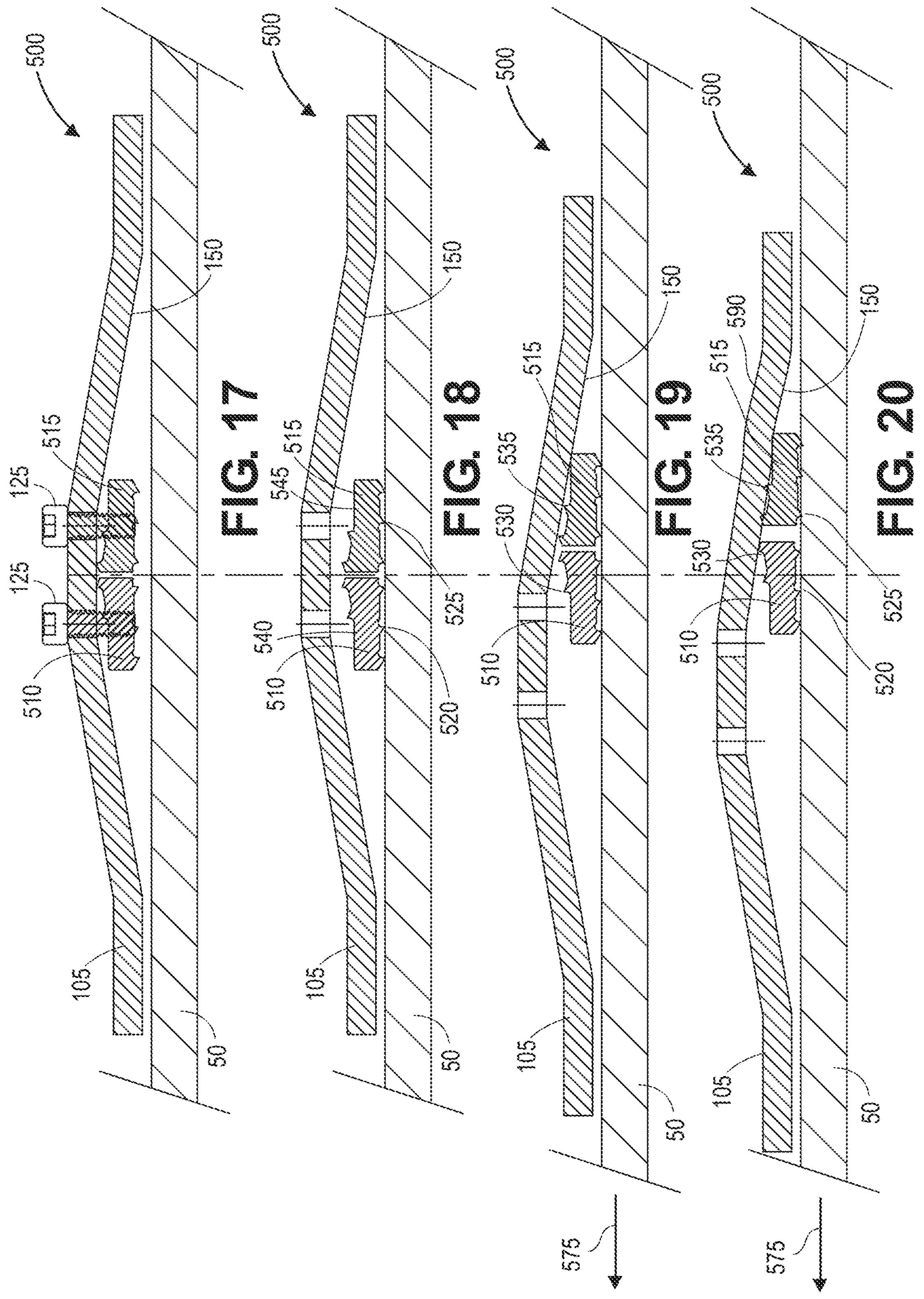
FIG. 17 is a sectional view of a tubular gripping device in a first (e.g. pre-installed) position, according to an embodiment.
FIG. 18 is a sectional view of the tubular gripping device in a second position, according to an embodiment.
FIG. 19 is a sectional view of the tubular gripping device in a third position, according to an embodiment.
FIG. 20 is a sectional view of the tubular gripping device in a fourth (e.g. engaged) position, according to an embodiment.

FIG. 17 is a sectional view of a tubular gripping device 500 in a first (e.g. pre-installed) position, according to an embodiment. The tubular gripping device 500 is similar to tubular gripping device 100 as shown in FIGS. 1-3. For convenience, the components in FIGS. 17-20 that are similar to the components in FIGS. 1-3 will be labelled with the same reference number.

As shown in FIG. 17, the connection members 125 are configured to hold a first grip ring 510 and a second grip ring 515 against the inner surface 150 of the body 105 when the tubular gripping device 500 is in the pre-installed position. In other words, the first grip ring 510 and the second grip ring 515 (i.e., self-locking mechanism) are in an expanded position away from engagement with an outer surface of a casing 50. As also shown, the first grip ring 510 and the second grip ring 515 have a substantially constant wall thickness where the connection members 125 are installed.

FIG. 18 is a sectional view of the tubular gripping device 500 in a second position, according to an embodiment. As shown, the connection members 125 have been removed, which allows the first grip ring 510 and the second grip ring 515 to move into engagement with the outer surface of the casing 50. In other words, the first grip ring 510 and the second grip ring 515 have moved from an expanded position (FIG. 17) to a retracted position (FIG. 18).

The first grip ring 515 includes a grip profile 520, such as wickers, on an inner surface. The grip profile 520 is configured to grip (or bite or penetrate) into the outer surface of the casing 50. Similarly, the second grip ring 515 includes a grip profile 525, such as wickers, on an inner surface that is configured to grip (or bite or penetrate) into the outer surface of the casing 50. The second grip ring 515 further includes a sliding load surface 545 that is configured to engage with the inner surface 150 if the body 105 of the tubular gripping device 500. The first grip ring 510 may also include a sliding load surface 540. The tubular gripping device 500 is bi-directional, which allows the tubular gripping device 500 to be activated whether the body 105 is moved in a first axial direction as described herein or a second axial direction because both the first and second grip rings 510, 515 include the sliding load surface 540, 545. In the position shown in FIG. 18, the tubular gripping device 500 is in a neutral position where no external forces are applied to the body 105.

FIG. 19 is a sectional view of the tubular gripping device 500 in a third position, according to an embodiment. External axial applied forces have moved the body 105 in a first axial direction 575, which causes the body 105 to come into contact with the second grip ring 515. As shown, the sliding load surface 545 of the second grip ring 515 has engaged with a taper on the inner surface 150 of the body 105. As also shown, the grip profile 525 of the second grip ring 515 has not yet fully engaged with the outer surface of casing 50.

FIG. 20 is a sectional view of the tubular gripping device 500 in a fourth (e.g. engaged) position, according to an embodiment. External axial applied forces have moved the body 105 further in the first axial direction 575. The movement of the body 105 has caused radial deformation of the body 105 responding to the reactive loads at the point of slidable contact between the sliding load surface 545 of the second grip ring 515 and the taper on the inner surface 150 of the body 105.

As shown in FIG. 20, the sliding load surface 545 of the second grip ring 515 is fully engaged with the inner surface 150 of the body 105. Also, a double hook grip profile 535, such as wickers, on an outer surface of the second grip ring 515 has engaged (e.g., grip or bite or penetrate) with the inner surface 150 of the body 105. In the same manner, a double hook grip profile 530, such as wickers, on an outer surface of the first grip ring 510 may engage (e.g., grip or bite) with the inner surface 150 of the body 105 depending on the location. In other words, in this configuration, the first grip ring 510 may come in contact with the surface 150 but is free to slide in the direction 575. If it slides in the direction 575, it will only grip when loaded from the opposite direction (from direction 575). As also shown, the grip profiles 520, 525 of the first and second grip rings 510, 515 has engaged (e.g., grip or bite or penetrate) with the outer surface of the casing 50.

The associated axial movement is shown to have occurred to the extent that the double hook grip profile 535 of the second grip ring 515 has engaged the body 105 to form a load shoulder 590 in the body 105. In other words, the body 105 is reformed to create the load shoulder 590 due to the engagement (or penetration) of the double hook grip profile 535 of the second grip ring 515 with the body 105. Additional applied load to the body 105 will not cause substantial additional movement of the body 105 as the engaged double hook grip profile 535 will tend to resist further relative sliding between the second grip ring 515 and the body 105.

Figure 21:
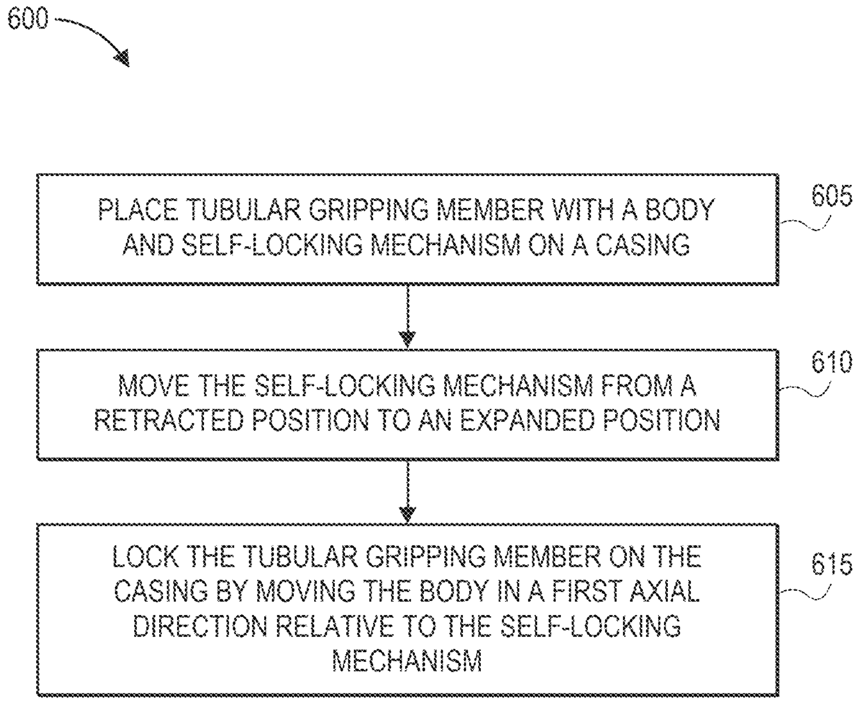
FIG. 21 illustrates a flowchart of a method for operating a tubular gripping device on a casing, according to an embodiment.

FIG. 21 illustrates a flowchart of a method 600 for operating the tubular gripping device 200 on the casing 50, according to an embodiment. An illustrative order of the method 600 is provided below, however, one or more steps of the method 600 may be performed in a different order, simultaneously, repeated, or omitted. Further, the method 600 could apply to any embodiment described herein.

The method 600 may include placing the tubular gripping device with a body and a self-locking mechanism on a casing, as at 605. The tubular gripping device 200 shown in FIG. 4 is in the pre-installed position and FIG. 5 is the run-in position.

The method 600 may include moving the self-locking mechanism from a retracted position to an expanded position, as at 610. The first grip ring 210 and the second grip ring 215 have moved from an expanded position (FIG. 4) to a retracted position (FIG. 5).

The method 600 may include locking the tubular gripping device on the casing by moving the body in a first axial direction relative to the self-locking mechanism, as at 615. As shown in FIG. 7, external axial applied forces have moved the body 105 in a first axial direction 275 relative to the first grip ring 210 and the second grip ring 215.

As used herein, the terms “inner” and “outer”; “up” and “down”; “upper” and “lower”; “upward” and “downward”; “above” and “below”; “inward” and “outward”; “uphole” and “downhole”; and other like terms as used herein refer to relative positions to one another and are not intended to denote a particular direction or spatial orientation. The terms “couple,” “coupled,” “connect,” “connection,” “connected,”

"in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A tubular gripping device for use with a casing, comprising:

a body having an inner surface;

at least one grip ring having a first surface and a second surface, wherein the at least one grip ring is movable from an expanded position to a retracted position; and a connection member configured to hold the at least one grip ring in the expanded position, wherein the first surface of the at least one grip ring engages the inner surface of the body when the at least one grip ring is in the expanded position and the second surface of the at least one grip ring engages the casing when the at least one grip ring is in the retracted position, and wherein the body is movable in an axial direction relative to the at least one grip ring when the at least one grip ring is in the retracted position.

2. The tubular gripping device of claim 1, wherein a load shoulder is formed in the body as the body moves relative to the at least one grip ring.

3. The tubular gripping device of claim 1, wherein the at least one grip ring includes a first grip profile on the first surface.

4. A tubular gripping device for use with a casing, comprising:

a body having an inner surface;

at least one grip ring having a first surface with a first grip profile and a second surface, wherein the at least one grip ring is movable from an expanded position to a retracted position; and a connection member configured to hold the at least one grip ring in the expanded position, wherein the first surface of the at least one grip ring engages the inner surface of the body when the at least one grip ring is in the expanded position and the second surface of the at least one grip ring engages the casing when the at least one grip ring is in the retracted position, and wherein the first grip profile on the at least one grip ring penetrates the body as the body moves relative to the at least one grip ring.

5. The tubular gripping device of claim 3, wherein the at least one grip ring includes a second grip profile on the second surface.

6. A tubular gripping device for use with a casing, comprising:

a body having an inner surface;

at least one grip ring having a first surface with a first grip profile and a second surface with a second grip profile, wherein the at least one grip ring is movable from an expanded position to a retracted position; and a connection member configured to hold the at least one grip ring in the expanded position, wherein the first surface of the at least one grip ring engages the inner surface of the body when the at least one grip ring is in the expanded position and the second surface of the at least one grip ring engages the casing when the at least one grip ring is in the retracted position and wherein the second grip profile on the at least one grip ring is configured to penetrate the casing as the body moves relative to the at least one grip ring.

7. A tubular gripping device for use with a casing, comprising:

a body having an inner surface;

at least one grip ring having a first surface and a second surface, wherein the at least one grip ring is movable from an expanded position to a retracted position; and wherein the at least one grip ring includes a first grip profile on the first surface that is a wicker and a connection member configured to hold the at least one grip ring in the expanded position, wherein the first surface of the at least one grip ring engages the inner surface of the body when the at least one grip ring is in the expanded position and the second surface of the at least one grip ring engages the casing when the at least one grip ring is in the retracted position.

8. The tubular gripping device of claim 1, wherein the at least one grip ring is a C-ring.

9. A tubular gripping device for use with a casing, comprising:

a body having an inner surface;

at least one grip ring having a first surface and a second surface, wherein the at least one grip ring is movable from an expanded position to a retracted position; and a connection member configured to hold the at least one grip ring in the expanded position, wherein the first surface of the at least one grip ring engages the inner surface of the body when the at least one grip ring is in the expanded position and the second surface of the at least one grip ring engages the casing when the at least one grip ring is in the retracted position, and wherein the at least one grip ring includes a load shoulder that is configured to engage a load shoulder on the body when the body moves relative to the at least one grip ring.

10. A method of using a tubular gripping device on a casing, the method comprising:

placing the tubular gripping device on the casing, the tubular gripping device includes a body and a self-locking mechanism;

moving the self-locking mechanism from an expanded position to a retracted position; and locking the tubular gripping mechanism on the casing by moving the body relative to the self-locking mechanism when the self-locking mechanism is in the retracted position.

11. The method of claim 10, further comprising forming a load shoulder in the body as the body moves relative to the self-locking mechanism.

12. The method of claim 10, wherein the self-locking mechanism includes a grip profile configured to penetrate the body as the body moves relative to the self-locking mechanism.

13. The method of claim 10, wherein the self-locking mechanism includes a grip profile configured to penetrate the casing as the body moves relative to the self-locking mechanism.

14. The method of claim 10, wherein a load shoulder on the self-locking mechanism engages a load shoulder on the body when the tubular gripping mechanism is locked on the casing.

15. A tubular gripping device comprising:

a body;

a self-locking mechanism disposed in the body, the self-locking mechanism configured to move from an expanded position to a retracted position upon release of a connection member, wherein the body is movable in an axial direction relative to the self-locking mechanism when the self-locking mechanism is in the retracted position, and wherein a load shoulder is formed in the body as the body moves relative to the self-locking mechanism.

16. The tubular gripping device of claim 15, wherein the self-locking mechanism includes a grip profile that is configured to penetrate the body as the body moves relative to the self-locking mechanism.

17. The tubular gripping device of claim 15, wherein the self-locking mechanism includes a grip profile that is configured to penetrate a casing as the body moves relative to the self-locking mechanism.

18. The tubular gripping device of claim 15, wherein the self-locking mechanism comprises a first grip ring and a second grip ring.

19. The tubular gripping device of claim 18, wherein an end of the first grip ring is offset from an end of the second grip ring.

* * * * *